(12) United States Patent
Kim (10) Patent No.: US 12,263,763 B2
(45) Date of Patent: Apr. 1, 2025

(54) SEAT RECLINING BRAKE DEVICE FOR VEHICLE

(71) Applicant: Hyundai Transys Inc., Seosan-si (KR)

(72) Inventor: Won Kim, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 140 days.

(21) Appl. No.: 18/312,657

(22) Filed: May 5, 2023

(65) Prior Publication Data

US 2023/0406167 A1  Dec. 21, 2023

(30) Foreign Application Priority Data

May 17, 2022 (KR) .......................... 10-2022-0060380

(51) Int. Cl.
  *B60N 2/22* (2006.01)
(52) U.S. Cl.
  CPC .................................. *B60N 2/2227* (2013.01)
(58) Field of Classification Search
  CPC ..................................................... B60N 2/2227
  See application file for complete search history.

(56) References Cited

FOREIGN PATENT DOCUMENTS

| DE | 4317150 C1 | 10/1994 |
|---|---|---|
| DE | 19616680 A1 | 11/1997 |
| DE | 102008028086 A1 | 12/2009 |
| KR | 10-0812232 B1 | 3/2008 |
| KR | 10-2011-0087070 A | 8/2011 |
| KR | 10-2071474 B1 | 1/2020 |
| KR | 10-2020-0064261 A | 6/2020 |
| KR | 10-2021-0067583 A | 6/2021 |

OTHER PUBLICATIONS

Chevallier Frederic, "Search Report for EP Application No. 23173414. 6-1012", Oct. 4, 2023, EPO, Munich, Germany.

*Primary Examiner* — Mark R Wendell
(74) *Attorney, Agent, or Firm* — Bridgeway IP Law Group, PLLC; Jihun Kim (57) ABSTRACT

A seat reclining brake device for a vehicle includes a socket housing having an accommodating space, a locking plate inserted into accommodating space and coupled to a rotating shaft, a fixing portion formed at a position facing the locking plate and the socket housing, engaged with each other to block a relative rotation of the locking plate and socket housing or disengaged with each other, an elastic body inserted into accommodating space to apply an elastic force to locking plate in the direction in which the fixing portion is engaged, and a lever that is rotatably fastened to socket housing and includes a fixing release portion extending toward socket housing, having an inclining portion, and when the lever is rotated, moving along an inclining portion of the locking plate in the direction opposite the direction in which the elastic body applies the elastic force to disengage the fixing portion.

8 Claims, 10 Drawing Sheets

SEAT RECLINING BRAKE DEVICE FOR VEHICLE

CROSS REFERENCE TO RELATED APPLICATION

The present application claims priority to Korean Patent Application No. 10-2022-0060380, filed May 17, 2022, the entire contents of which is incorporated herein for all purposes by this reference.

BACKGROUND OF THE INVENTION

Field of the Invention

The present invention relates to a seat reclining brake device for a vehicle, and more particularly to a device for fixing a seatback that is rotatably coupled to a seat cushion to the seat cushion.

Description of the Related Art

In general, a seat of a vehicle is composed of a seat cushion that is installed to bear the load of a passenger and be moveable in the forward and backward directions with respect to the interior floor to support the lower body part of the passenger and a seatback that is installed to be rotatable at certain angles with respect to the seat cushion to support the upper body part of the passenger.

A sliding device with which a driver or a passenger adjusts the front and rear positions of the seat by pulling or pushing the seat cushion forward or backward according to their body features and a recliner for variably adjusting the inclination angle of the seatback with respect to the seat cushion to secure the most comfortable posture when the driver or passenger is seated are provided in the seat.

A fixing force is generated by rubbing against a socket housing through an elastic force of an elastic body to fix the backseat in the above-mentioned recliner equipped with a conventional external brake unit, but due to this structure, there were problems with the increased size of the conventional external brake unit and the limited fixing force generated by the frictional force of the elastic body.

The matters described as background art described above are only for a better understanding of the background of the present invention and are not to be taken as an acknowledgment that the present invention pertains to the related art already known to those skilled in the art.

SUMMARY OF THE INVENTION

The present invention is proposed to resolve the issues described above, and an object of the present invention is to provide a seat reclining brake device for a vehicle in which a socket housing and a locking plate that may engage with each other are provided, the engagement is released and a seatback rotates when a lever is rotated, and the socket housing and the locking plate engage with each other and the seatback is fixed when the rotation of the lever is stopped.

According to an embodiment of the present invention, the seat reclining brake device for a vehicle may include: a socket housing having a center penetrated in a rotational axial direction of the seatback and an accommodating space with an open side; a locking plate inserted into the accommodating space and coupled to a rotating shaft of the seatback at the center; a fixing portion formed at a position facing the locking plate and the socket housing, engaged with each other to block the relative rotation of the locking plate and the socket housing, and disengaged when the locking plate and the socket housing are spaced apart from each other in the rotational axial direction; an elastic body inserted into the accommodating space to apply an elastic force to the locking plate in the direction in which the fixing portion is engaged; and a lever that is rotatably fastened to one side of the socket housing and includes a fixing release portion extending toward the socket housing, having an inclining portion formed therein, and when the lever is rotated, moving along the inclining portion in the direction opposite the direction in which the elastic body applies the elastic force to disengage the fixing portion.

A protrusion may be formed to protrude in one of the locking plate and the socket housing. An insertion recess, into which the protrusion may be inserted, may be formed in the other one of the locking plate and the socket housing. The protrusions and the insertion recess may be included in the fixing portion.

A plurality of protrusions may be formed along the inner circumferential surface of the accommodating space, and a plurality of insertion recesses may be formed along the outer circumferential surface of the locking plate to engage with the protrusions.

The plurality of protrusions may be formed in the circumferential direction on a surface of one of the locking plate and the socket housing where the locking plate and the socket housing face each other, and the insertion recesses may be formed in correspondence to the protrusions in the other one of the locking plate and the socket housing to engage with the protrusions.

The elastic body may be disposed between the locking plate and the lever such that one side is in contact with the locking plate and the other side is in contact with the lever to apply an elastic force to the locking plate toward the socket housing to fasten the fixing portion.

A through portion that the fixing release portion penetrates may be provided in the locking plate, and the inclining portion may be provided with a cross-sectional area diminishing from the end of the fixing release portion toward the lever so that when the lever is rotated, the locking plate may move toward the lever along the inclining portion while pressing the elastic body, disengage the fixing portion, and rotate together with the lever.

The elastic body may be disposed between the locking plate and the socket housing such that one side of the elastic body is in contact with the socket housing and the other side of the elastic body is in contact with the locking plate to fasten the fixing portion while pressing the locking plate toward the lever.

A locking plate may include a through portion that the fixing release portion penetrates, and an inclining portion may be formed to have a cross-sectional area expanding from the point where the fixing release portion starts to extend toward the lever so that when the lever is rotated, the locking plate may move along the inclining portion toward the socket housing while pressing the elastic body, disengage the fixing portion, and rotate together with the lever.

A plurality of inclining portions and through portions may be arranged apart from each other in the circumferential direction around the rotational axis of the seatback.

An inner surface in contact with the inclining portion may be formed in the through portion to incline in correspondence to the inclining portion.

The inclining portion is formed on either side of the fixing release portion so that the lever may be rotated in either direction.

A socket housing may include a protruding portion, which protrudes along an outer circumferential surface of the socket housing, and the lever includes a locking portion extending to the socket housing and having a locking jaw protruding toward the center of the socket housing to engage with the protruding portion.

The seat reclining brake device for a vehicle according to an embodiment of the present invention is formed in a structure in which a locking plate is provided in the socket housing, a fixing portion engaging the socket housing with the locking plate is formed, the engagement of the fixing portion is maintained in the locking plate by the elasticity of the elastic portion, and the fixing portion may disengage as the locking plate compresses the elastic portion according to the rotation of the lever, and thus the seat reclining brake device for a vehicle according to the present invention has the effect of improving the fixing force by which the seatback is fixed to the seat cushion according as the fixing portion is fixed through engagement, compared to the conventional seat reclining brake device for a vehicle configured such that the fixing portion is formed of an elastic body, rubs against the socket housing by the elastic force of the elastic body, and is fixed by friction.

DETAILED DESCRIPTION OF THE INVENTION

The embodiments disclosed herein will be described in detail with reference to the accompanying drawings. However, the same or similar components will be given the same reference numerals irrespective of the drawing numbers, and the repetitive descriptions will be omitted.

The suffixes "module" and "unit" for the components used in the following description are given or interchangeably used only in consideration of the ease of writing the specification and do not have meanings or roles distinct from each other by themselves.

When it is determined that the specific description of the related and already known technology may obscure the gist of the embodiments disclosed herein, the specific description will be omitted. Further, it is to be understood that the accompanying drawings are for a better understanding of the embodiment disclosed herein and that the technical ideas disclosed herein are not limited to the accompanying drawings and include all the modifications, equivalents, or substitutes included in the spirit and technical scope of the present invention.

The terms including ordinal numbers such as first, second, and the like may be used to describe various components, but the components are not to be limited by the terms. The terms may only be used for the purpose of distinguishing one component from the other.

It is to be understood that when a component is referred to as being "connected" or "coupled" to another component, the component may be directly connected or coupled to the another component, but other components may be interposed therebetween. In contrast, it is to be understood that when a component is referred to as being "directly connected" or "directly coupled" to another component, no other component is interposed therebetween.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

Figure 1:
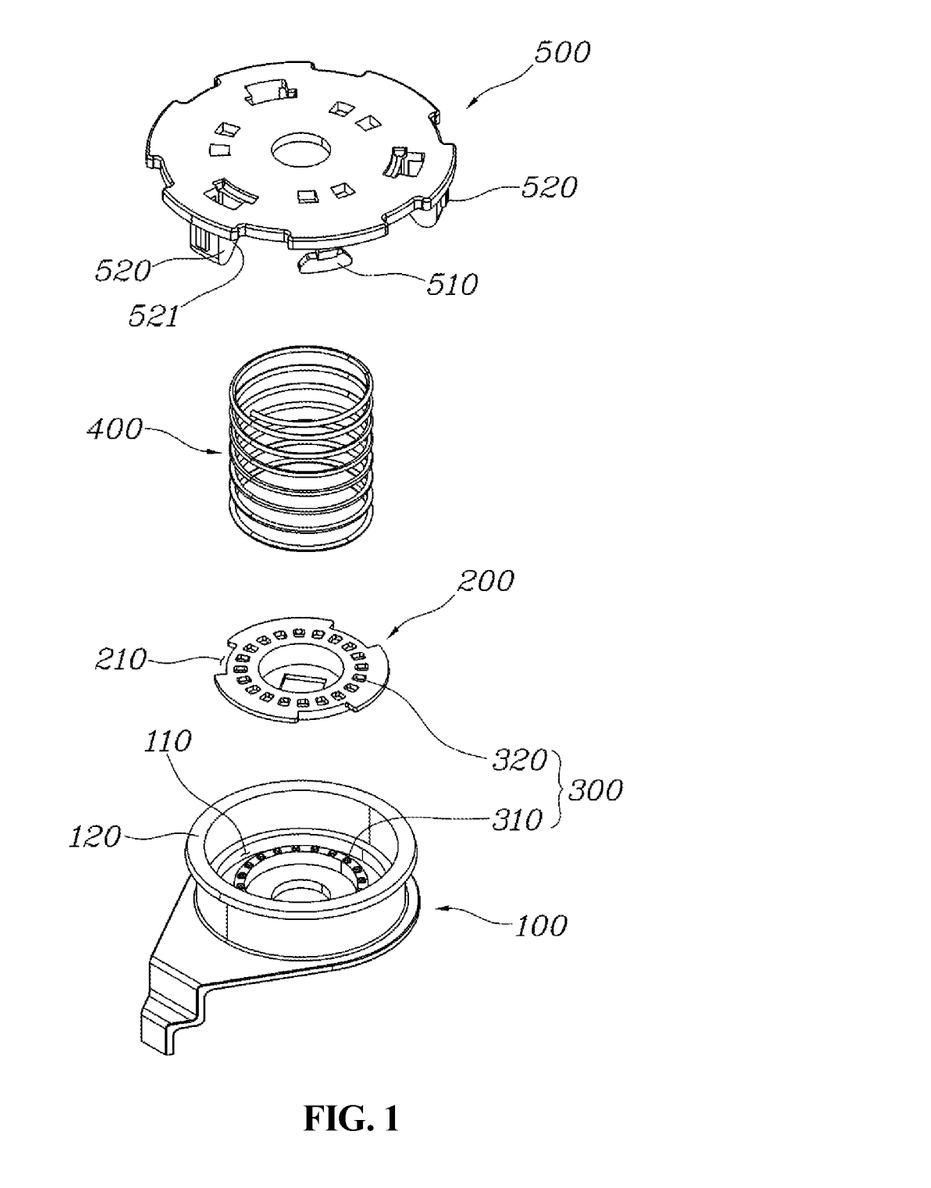
FIG. 1 is an exploded perspective view of a seat reclining brake device for a vehicle according to an embodiment of the present invention.
Figure 2:
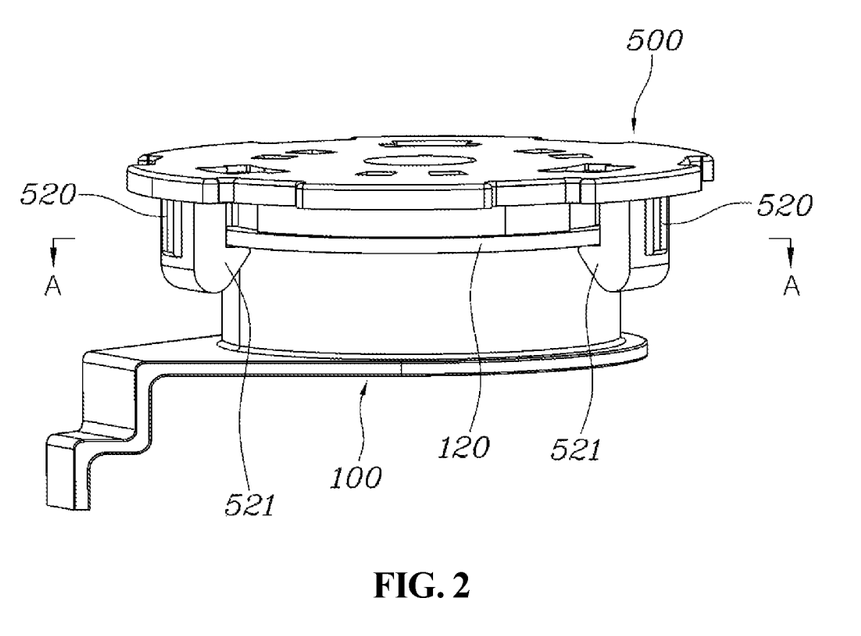
FIG. 2 is a perspective view of a seat reclining brake device for a vehicle according to an embodiment of the present invention.
Figure 4:
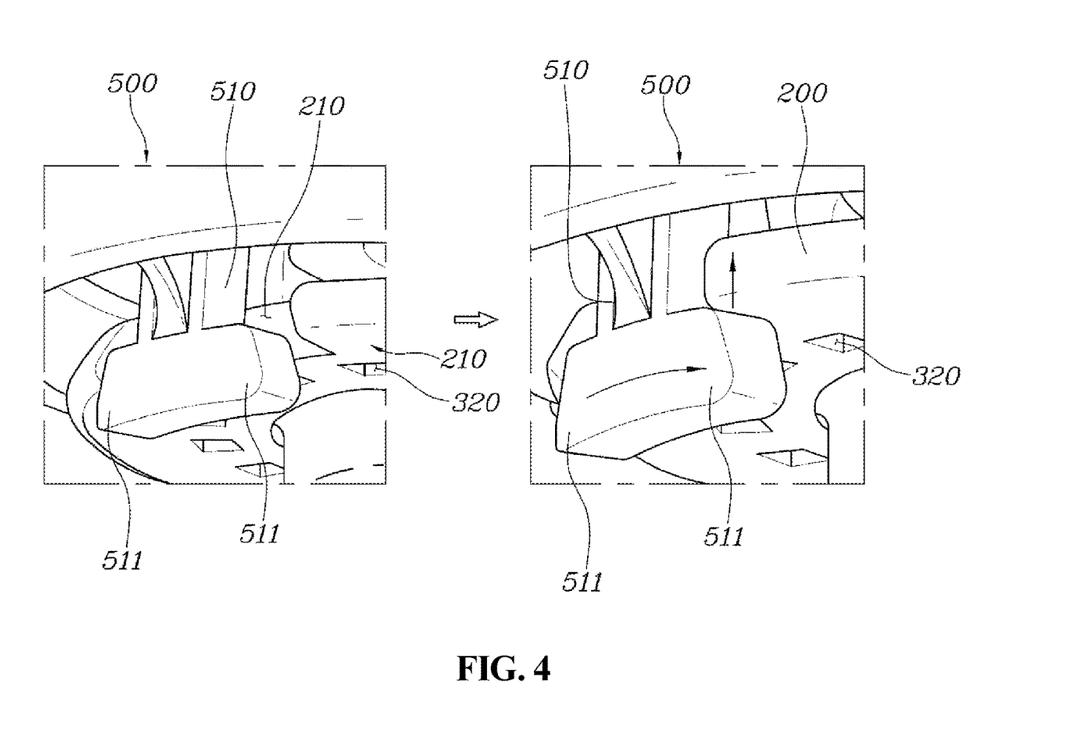
FIG. 4 is a view illustrating a first embodiment of a fixing release portion included in a seat reclining brake device for a vehicle according to the present invention.
Figure 5:
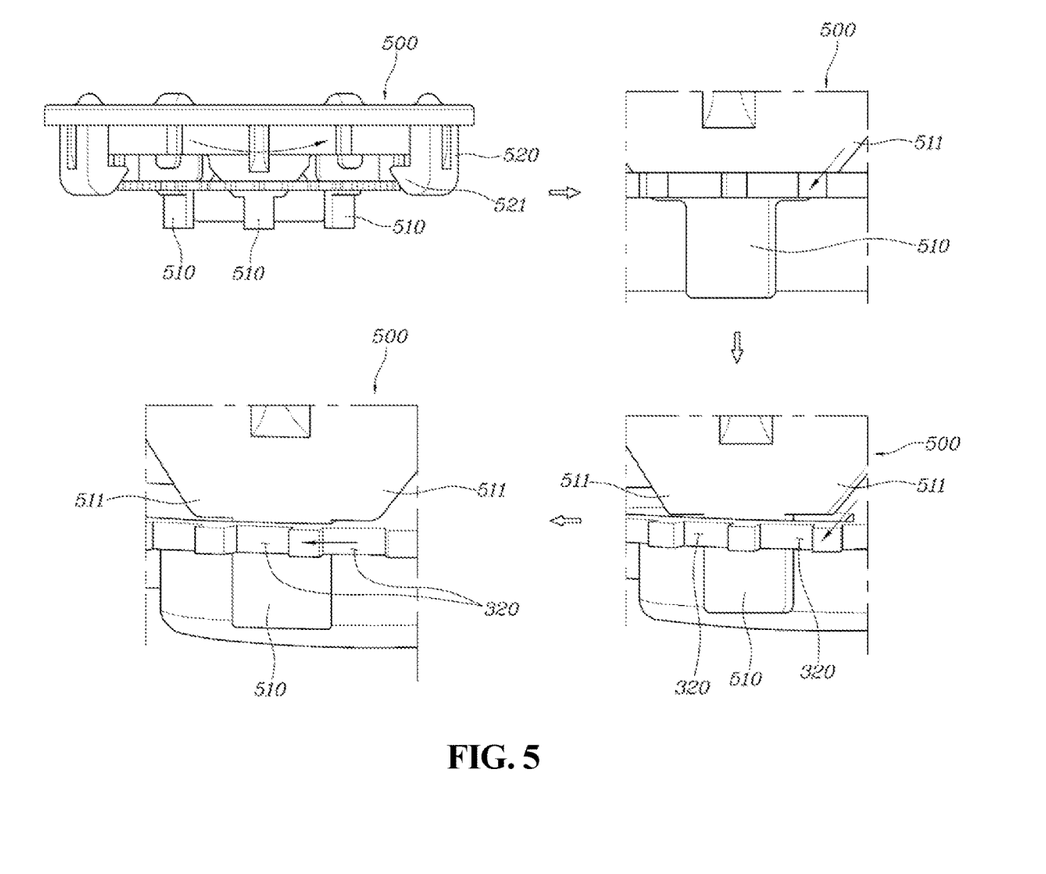
FIG. 5 is a view illustrating a second embodiment of a fixing release portion included in a seat reclining brake device for a vehicle according to the present invention.

FIG. 1 is an exploded perspective view of a seat reclining brake device for a vehicle according to an embodiment of the present invention. FIG. 2 is a perspective view of a seat reclining brake device for a vehicle according to an embodiment of the present invention. FIGS. 3A-3D are cross-sectional views of the seat reclining brake device taken along A-A in FIG. 2. FIG. 4 is a view illustrating a first embodiment of a fixing release portion 510 included in a seat reclining brake device for a vehicle according to the present invention. FIG. 5 is a view illustrating a second embodiment of a fixing release portion 510 included in a seat reclining brake device for a vehicle according to the present invention. FIGS. 6 to 9 are views illustrating a fixing portion 300 included in a seat reclining brake device for a vehicle according to various embodiments of the present invention.

Preferred embodiments of a seat reclining brake device for a vehicle according to the present invention will be described with reference to FIGS. 1 to 9.

A seat provided for a passenger to be seated in a vehicle may be provided with a seat cushion contacting the passenger's legs and a seatback contacting the passenger's back, and the seatback may be rotatably coupled to the seat cushion.

A seat reclining brake device may be provided to fix the reclining of the seatback rotatably coupled to the seat cushion.

According to the present invention, the seat reclining brake device is a device for fixing the rotation of the seatback as described above.

According to the present invention, the seat reclining brake device for a vehicle includes: a socket housing 100 having a center portion penetrated in the rotational axial direction of a seatback and an accommodating space 110 with an open side; a locking plate 200 inserted into the accommodating space 110 and coupled to a rotating shaft of the seatback at a center portion; a fixing portion 300 formed at a position facing the locking plate 200 and the socket housing 100, engaged with each other to block the relative rotation of the locking plate 200 and socket housing 100, and disengaged when the locking plate 200 and the socket housing 100 are spaced apart from each other in the rotational axial direction; an elastic portion inserted into the accommodating space 110 to apply an elastic force to the locking plate 200 in the direction in which the fixing portion 300 is engaged; and a lever 500 that is rotatably fastened to one side of the socket housing 100 and includes a fixing release portion 510 extending toward the socket housing 100, having an inclining portion 511 formed therein, and when the lever is rotted, moving along an inclining portion 511 of the locking plate 200 in the direction opposite the direction in which the elastic portion applies the elastic force to disengage the fixing portion 300.

As shown in FIG. 1, the socket housing 100 may be formed such that a through center portion is formed to be penetrated for the rotating shaft of the seatback to pass through and that the accommodating space 110 is formed inside and has one side open in the direction in which the rotating shaft extends.

The locking plate 200 may be inserted into the accommodating space 110 on the open side of the accommodating space 110, and the locking plate 200 may be coupled to the rotating shaft of the seatback passing through the socket housing 100 and may be formed in a disc shape to rotate inside the accommodating space 110 when the rotating shaft rotates.

The fixing part 300 is provided to face each other inside the accommodating space 110 of the socket housing 100 and at the locking plate 200 to engage the locking plate 200 with the socket housing 100 so that the locking plate 200 may be prevented from rotating inside the accommodating space 110.

At this time, the socket housing 100 is coupled to the seat cushion and the locking plate 200 is coupled to the seatback so that the rotation of the seatback may be blocked when the fixing portion 300 engages with each other.

The elastic portion is provided inside the accommodating space 110 of the socket housing 100 and applies an elastic force in the direction in which the locking plate 200 is fixed to the socket housing 100 by engaging with the fixing portion 300 so that the locking plate 200 may be fixed inside the accommodating space 110.

In addition, the lever 500 coupled to the socket housing 100 to cover the open side of the accommodating space 110 of the socket housing 100 may be rotatably coupled to the socket housing 100 around the rotational axis of the seatback and may be provided with a fixing release portion 510 that extends from one surface of the socket housing 100 of the lever 500 and moves the locking plate 200 in the direction opposite the direction in which the elastic portion applies the elastic force to disengage the fixing portion 300.

The inclining portion 511 formed to incline in the direction opposite the direction in which the elastic portion applies the elastic force is included in the fixing release portion 510, and when a user rotates the lever 500, the locking plate 200 moves along the inclining portion 511 in the direction opposite the direction in which the elastic portion applies the elastic force so that the elastic portion is compressed, the fixing portion 300 disengages, and then the fixing of the seatback may be released.

The fixing portion 300 is formed of an elastic body 400, rubs against the socket housing 100 by the elastic force of the elastic body 400, and is fixed by friction in a conventional seat reclining brake device for a vehicle, while the fixing portion 300 is fixed through engagement with each other in the seat reclining brake device for a vehicle according to the present invention, thereby having the effect of improving fixing force compared to the conventional seat reclining brake device for a vehicle.

A protrusion 310 protruding in either one of the locking plate 200 and the socket housing 100 and an insertion recess 320 into which the protrusion 310 is inserted in the other one may be included in the fixing portion 300.

As shown in FIGS. 6 to 9, the fixing portion 300 is formed of the protrusion 310 protruding in either one of the locking plate 200 and the socket housing 100 and the insertion recess 320 formed in the other one of the locking plate 200 and the socket housing 100 so that the locking plate 200 may be fixed to the socket housing 100 inside the accommodating space 110 of the socket housing 100 by the insertion of the protrusion 310 into the insertion recess 320 to engage therewith.

Through this, there is the effect of improving the fixing force compared to the conventional seat reclining brake device for a vehicle, and the locking plate 200 is formed to move a distance just enough for the protrusion 310 to withdraw from the insertion recess 320 to release the fixing of the fixing portion 300, which consequently reduces the thickness of the seatback in the rotating shaft direction compared to the seat reclining brake device of the conventional vehicle, thereby having the effect of reducing the volume.

Specific embodiments of the fixing portion 300 are as follows.

In the first embodiment of the fixing portion 300, a plurality of protrusions 310 are formed in the circumferential direction in either one of the locking plate 200 and the socket housing 100 on the surface where the locking plate 200 and the socket housing 100 face each other, and the insertion recesses 320 are formed in correspondence to the protrusions 310 in the other one and engage with the protrusions 310.

Figure 6:
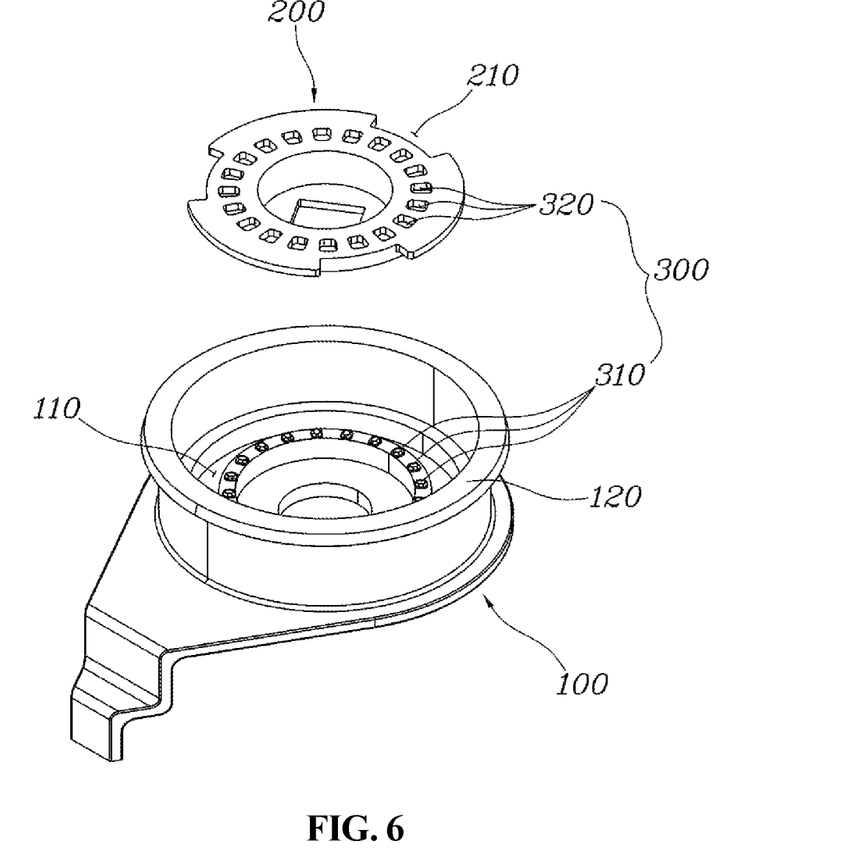
FIGS. 6 to 9 are views illustrating a fixing portion included in a seat reclining brake device for a vehicle according to various embodiments of the present invention.
Figure 7:
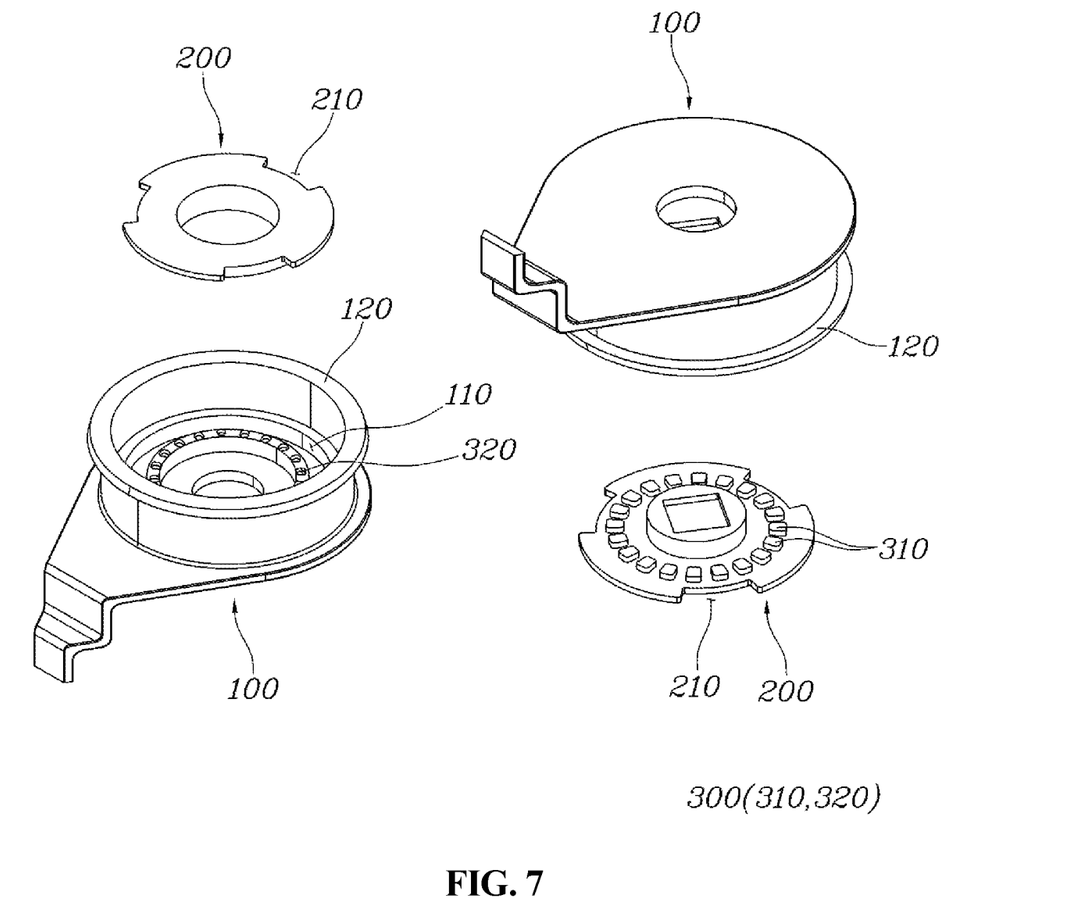

As shown in FIGS. 6 and 7, the protrusions 310 are formed to protrude in the direction facing one of the locking plate 200 and the socket housing 100 on the surface where the locking plate 200 and the socket housing 100 face each other, and the insertion recesses 320 may be formed to be inserted into the protrusions 310 in the other one of the locking plate 200 and the socket housing 100.

At this time, a plurality of protrusions 310 and insertion recesses 320 may be formed and be arranged apart from each other in the circumferential direction around the rotational axis of the seatback so that the protrusions 310 and the insertion recesses 320 may be fastened again by the elastic portion when the lever 500 is not rotated even if the fixing is released by the fixing release portion 510 and the locking plate 200 rotates.

FIG. 6 shows that the protrusions 310 are provided in the socket housing 100 and that the insertion recesses 320 are provided in the locking plate 200, while FIG. 7 shows that the protrusions 310 are provided in the locking plate 200 and that the insertion recesses 320 are provided in the socket housing 100.

In a first embodiment of the elastic body 400 arrangement, the elastic body 400 is disposed between the locking plate 200 and the lever 500 such that one side is in contact with the locking plate 200 and the other side is supported by the lever 500 and thus may apply an elastic force to the locking plate 200 toward the socket housing 100 to fasten the fixing portion 300.

Figure 3A:
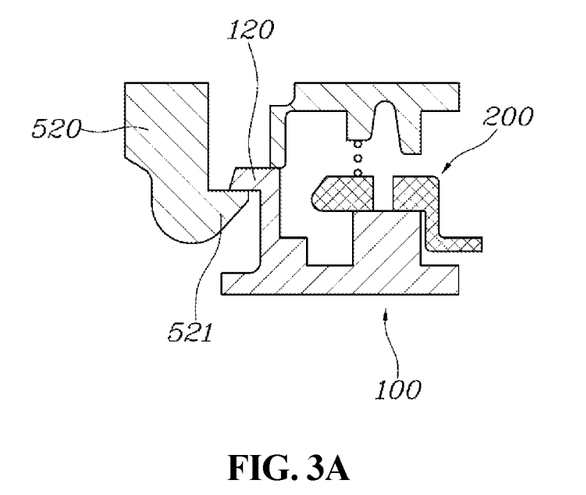
FIGS. 3A-3D are cross-sectional views of the seat reclining brake device taken along A-A in FIG. 2.
Figure 3B:
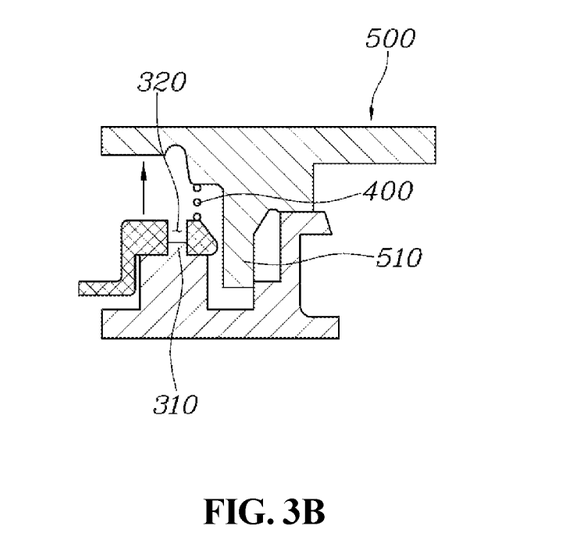

As shown in FIGS. 3A-3B, the elastic body 400 is disposed between the locking plate 200 and the lever 500 and applies an elastic force toward the locking plate 200 so that the fixing portion 300 in which the protrusions 310 and the insertion recesses 320 are formed face to face may be engaged at a position where the locking plate 200 and the socket housing 100 face each other.

Through this, the elastic portion is supported by the lever 500 that is coupled to the socket housing 100 and of which the movement in the axial direction is fixed and may apply an elastic force to the locking plate 200.

A through portion 210 that the fixing release portion 510 penetrates is provided in the locking plate 200, and an inclining portion 511 is provided with the cross-sectional area diminishing from the end of the fixing release portion 510 toward the lever 500 so that when the lever 500 is rotated, the locking plate 200 moves toward the lever 500 along the inclining portion 511 while pressing the elastic body 400, disengages the fixing portion 300, and may rotate together with the lever 500.

As shown in FIG. 4, the fixing release portion 510 extending from the socket housing 100 side of the lever 500 into the accommodating space 110 of the socket housing 100 is provided, the through portion 210 that the fixing release portion 510 penetrates is formed in the locking plate 200, and the inclining portion 511 having a cross-sectional area diminishing toward the lever 500 may be formed at the end of the fixing release portion 510.

At this time, when the user rotates the lever 500 as shown in FIG. 4, the fixing release portion 510 rotates simultaneously, the inclining portion 511 may come into contact with the locking plate 200 as the fixing release portion 510 penetrates the through portion 210 rotates, the locking plate 200 moves along the inclining portion 511 while compressing the elastic portion toward the lever 500, and the engagement between the protrusions 310 and the insertion recesses 320 of the fixing portion 300 may be released while the lever 500 is rotated.

In addition, when the user stops rotating the lever 500, the locking plate 200 moves toward the socket housing 100 along the inclining portion 511 by the elasticity of the elastic portion such that the protrusion 310 and the insertion recess 320 of the fixing portion 300 engage with each other so that the locking plate 200 may be fixed.

In a second embodiment of the fixing portion 300, a plurality of protrusions 310 is formed to protrude along the inner circumferential surface of the accommodating space 110, and a plurality of insertion recesses 320 may be formed along the outer circumferential surface of the locking plate 200 to engage with the protrusions 310.

Figure 8:
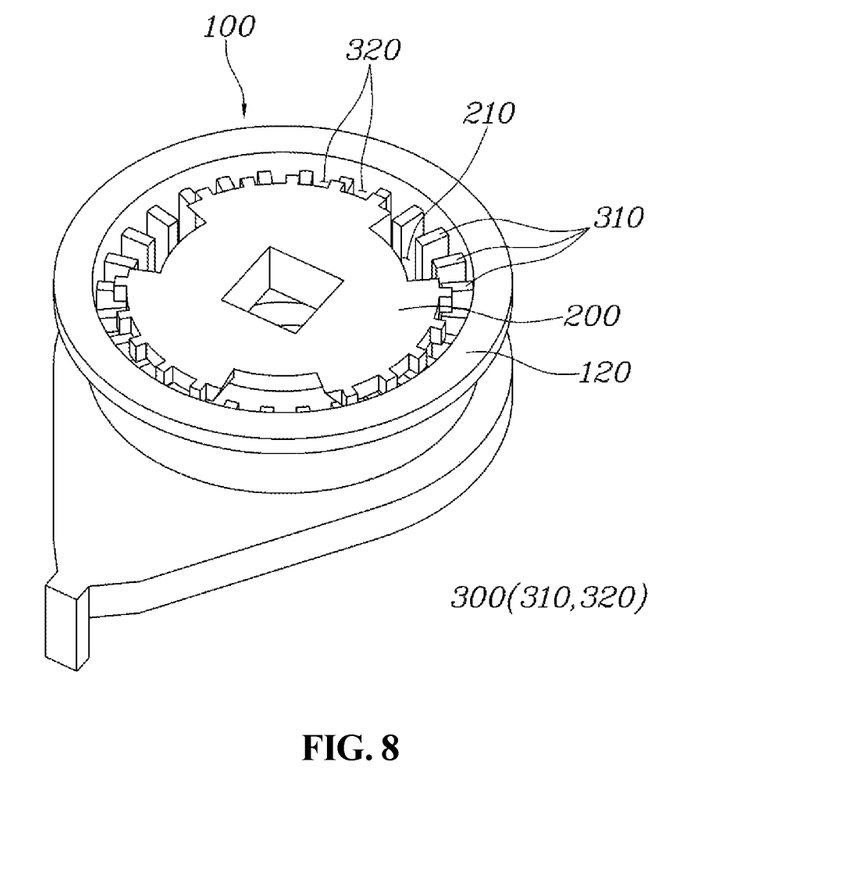
Figure 9:
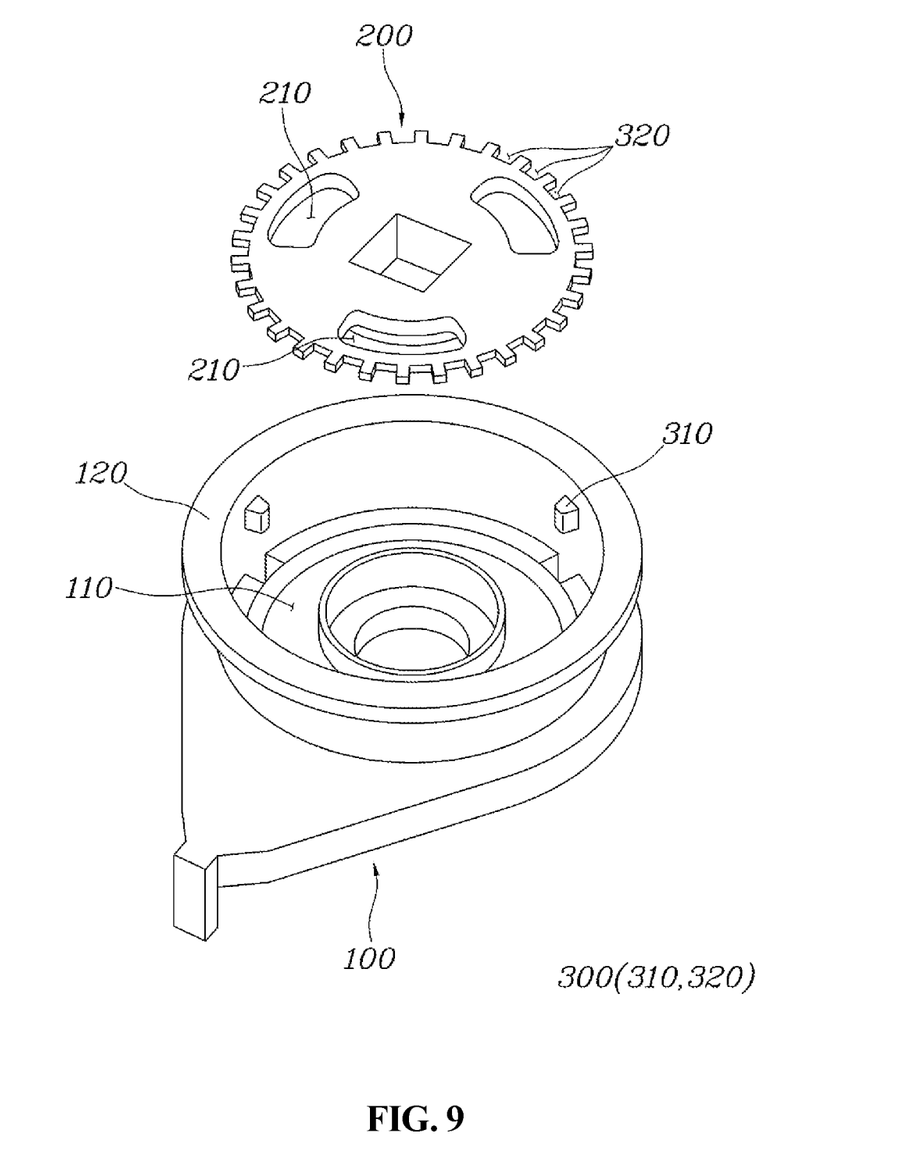

As shown in FIGS. 8 and 9, the fixing portion 300 may be formed of the protrusions 310 protruding from the inner circumferential surface of the accommodating space 110 and the insertion recesses 320 indented from the outer circumferential surface of the locking plate 200. The protrusions 310 and the insertion recesses 320 may trade positions with each other, and a plurality may be arranged apart from each other around the rotational axis of the seat.

Through this, the protrusions 310 and the insertion recesses 320 are disposed on the outer circumferential surface of the locking plate 200 and the inner circumferential surface of the accommodating space 110 as described above to engage with each other at the time of circumscription so that the locking plate 200 may disengage when moving to either side in the axial direction, thereby having the effect of improving the degree of freedom of design compared to the first embodiment of the fixing portion 300.

In a second embodiment of the elastic body 400 arrangement, the elastic body 400 is disposed between the locking plate 200 and the socket housing 100 such that one side is in contact with the socket housing 100 and the other side is in contact with the locking plate 200 and thus may fasten the fixing portion 300 while pressing the locking plate 200 toward the lever 500.

Figure 3C:
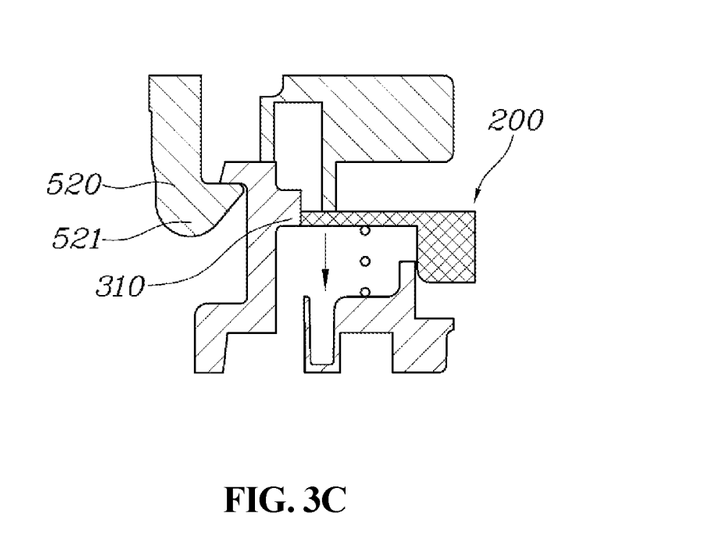
Figure 3D:
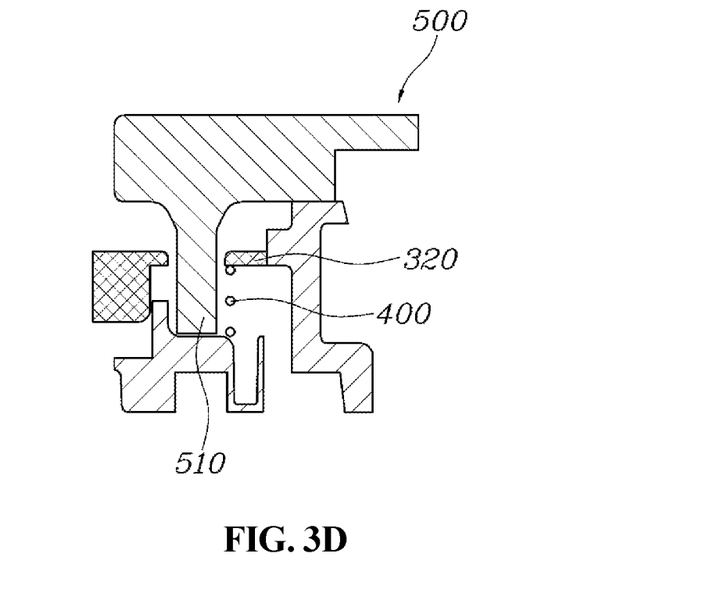

As shown in FIGS. 3C-3D, the elastic body 400 is disposed between the locking plate 200 and socket housing 100 and applies an elastic force toward the locking plate 200 so that the fixing portion 300 in which the protrusions 310 and the insertion recesses 320 are formed face to face may be engaged at a position where the outer circumferential surface of the locking plate 200 and the inner circumferential surface of the accommodating space 110 face each other.

A through portion 210 that the fixing release portion 510 penetrates is provided in the locking plate 200, and an inclining portion 511 is formed to have a cross-sectional area expanding from the point where the fixing release portion 510 starts to extend toward the lever 500 so that when the lever 500 is rotated, the locking plate 200 socket housing 100 along the inclining portion 511 while pressing the elastic body 400, disengages the fixing portion 300, and may rotate together with the lever 500.

As shown in FIG. 5, the inclining portion 511 is formed to have the cross-sectional area diminishing in the extending direction of the fixing release portion 510 from the point where the fixing release portion 510 starts to extend, the fixing release portion 510 also rotates when the lever 500 is rotated, and the locking plate 200 comes into contact with the inclining portion 511 to compress the elastic portion and moves along the inclining portion 511 so that the fixing portion 300 may disengage.

In addition, when the user stops rotating the lever 500, the locking plate 200 moves toward the lever 500 along the inclining portion 511 by the elasticity of the elastic portion such that the protrusions 310$v$ and the insertion recesses 320 of the fixing portion 300 engage with each other so that the locking plate 200 may be fixed.

A plurality of inclining portions 511 and through portions 210 may be arranged apart from each other in the circumferential direction around the rotational axis of the seatback.

As shown in FIG. 1, a plurality of fixing release portions 510 and through portions 210 may be formed apart from each other in the circumferential direction around the rotational axis of the seatback. In the embodiment of the present invention, three fixing release portions 510 and through portions 210 are formed, and the number may be increased or decreased.

Through this, the external force that the user applies to rotate the lever 500 is reduced, thereby having the effect of improving convenience in use.

An inner surface in contact with the inclining portion 511 may be formed in the through portion 210 to incline in correspondence to the inclining portion 511.

As shown in FIGS. 4 and 5, according to the first and second embodiments of the inclining portion 511 formed in the fixing release portion 510, the locking plate 200 moves along the inclining portion 511 in the rotational axial direction of the seatback when the lever 500 is rotated so that the fixing portion 300 may disengage.

At this time, the inclining portion 511 may come into contact with the inner surface of the through portion 210, and the inner surface of the through portion 210 may be formed in the same direction as the inclining direction of the inclining portion 511 to come into contact with the inclining portion 511 and move along the inclining portion 511.

Through this, there is the effect of reducing the wear of the locking plate 200 or the inclining portion 511 when the inclining portion 511 and the locking plate 200 come into contact, and there is also the effect of reducing the external force that actuates the lever 500.

The inclining portion 511 is formed on either side of the fixing release portion 510 so that the lever 500 may be rotated in either direction.

As shown in FIGS. 4 and 5, the inclining portion 511 formed in the fixing release portion 510 may be formed on both clockwise and counterclockwise sides to which the lever 500 is rotated.

Through this, the lever 500 may rotate the fixing portion 300 by moving the locking plate 200 in the rotational axial direction when rotated both clockwise and counterclockwise, thereby having the effect of freely rotating the seatback forward or backward.

A protruding portion 120 protruding outward from the outer circumferential surface to the outside along the outer circumferential surface may be included in the socket housing 100, and a locking portion 520 extending to the outside of the socket housing 100 and having a locking jaw 521 protruding at the end toward the center portion of the socket housing 100 to engage with the protruding portion 120 may be included in the lever 500.

As shown in FIG. 2, the protruding portion 120 may be formed to protrude from the outer circumferential surface of the socket housing 100 along the outer circumferential surface, a fastening portion extending in the rotational axial direction on the outer surface of the socket housing 100 may be provided in the lever 500, and the locking jaw 521 may be provided in the locking portion 520 to engage with the protruding portion 120.

A plurality of fastening portions may be arranged apart from each other in the circumferential direction around the rotational axis of the seatback.

Through this, the lever 500 may be coupled to the socket housing 100 to cover one side of the accommodating space 110 of the socket housing 100 and may be rotated in the coupled state.

Specific embodiments of the present invention have been illustrated and described, but it will be apparent to those skilled in the art that the invention may be improved upon and modified in various ways within the scope not departing from the technical spirit of the present invention as provided by the patent claims below.

What is claimed is:

1. A seat reclining brake device for a vehicle, comprising:
   a socket housing having a center penetrated in a rotational axial direction of a seatback, the socket housing having an accommodating space with an open side;
   a locking plate inserted into the accommodating space and configured to be coupled to a rotating shaft of the seatback at the center;
   a fixing portion defined at a position facing the locking plate and the socket housing, the fixing portion being configured to be engaged with each other to block a relative rotation of the locking plate and socket housing, the fixing portion being configured to be disengaged when the locking plate and the socket housing are spaced apart in the rotational axial direction;
   an elastic body inserted into the accommodating space to apply an elastic force to the locking plate in a direction in which the fixing portion is engaged; and
   a lever rotatably fastened to one side of the socket housing, the lever including a fixing release portion extending toward the socket housing, the fixing release portion having an inclining portion defined therein,
   wherein the elastic body is disposed between the locking plate and the socket housing such that one side of the elastic body is in contact with the socket housing and another side of the elastic body is in contact with the locking plate to fasten the fixing portion while pressing the locking plate toward the lever,
   wherein the locking plate includes a through portion that the fixing release portion penetrates, and
   wherein the inclining portion has a cross-sectional area expanding from a point where the fixing release portion starts to extend toward the lever, such that, when the lever is rotated, the locking plate moves along the inclining portion toward the socket housing while pressing the elastic body, disengages the fixing portion, and rotates together with the lever.

2. The seat reclining brake device for the vehicle of claim 1,
   wherein:
   a protrusion is defined to protrude in one of the locking plate and the socket housing;
   an insertion recess, into which the protrusion is to be inserted, is defined in the other one of the locking plate and the socket housing; and
   the protrusion and the insertion recess are included in the fixing portion.

3. The seat reclining brake device for the vehicle of claim 1,
   wherein a plurality of protrusions is defined to protrude along an inner circumferential surface of the accommodating space and a plurality of insertion recesses is defined along an outer circumferential surface of the locking plate to engage with the plurality of protrusions.

4. The seat reclining brake device for the vehicle of claim 1,
   wherein a plurality of protrusions is defined on a surface of one of the locking plate and the socket housing where the locking plate and the socket housing face each other, and a plurality of insertion recesses is defined in correspondence to the plurality of protrusions in the other one of the locking plate and the socket housing to engage with the plurality of protrusions.

5. The seat reclining brake device for the vehicle of claim 1,
   wherein a plurality of inclining portions are arranged apart from each other in a circumferential direction around a rotational axis of the seatback, and
   wherein a plurality of through portions are arranged apart from each other in the circumferential direction around the rotational axis of the seatback.

6. The seat reclining brake device for the vehicle of claim 1. wherein the through portion has an inner surface configured to be in contact with the inclining portion, the inner surface inclining in correspondence to the inclining portion.

7. The seat reclining brake device for the vehicle of claim 1,
   wherein the inclining portion is defined on either side of the fixing release portion to rotate the lever in either direction.

8. The seat reclining brake device for the vehicle of claim 1,
   wherein:
   the socket housing includes a protruding portion, which protrudes along an outer circumferential surface of the socket housing, and
   the lever includes a locking portion extending toward the socket housing and having a locking jaw protruding toward the center of the socket housing to engage with the protruding portion.

* * * * *